United States Patent [19]

Schwebke

[11] 4,268,211
[45] May 19, 1981

[54] GUIDE DEVICE FOR BOAT TRAILERS

[76] Inventor: Donald D. Schwebke, P.O. Box 302, Hampton, Iowa 50441

[21] Appl. No.: 49,308

[22] Filed: Jun. 18, 1979

[51] Int. Cl.³ .............................................. B60P 3/10
[52] U.S. Cl. .............................. 414/535; 280/414 R; 414/532
[58] Field of Search ............... 414/529, 532, 533, 534, 414/535; 280/414 R; 193/35 C

[56] References Cited

U.S. PATENT DOCUMENTS

| | | | |
|---|---|---|---|
| 3,021,969 | 2/1962 | Peake et al. | 414/533 |
| 3,160,297 | 12/1964 | Stumvoll | 414/532 |
| 3,178,043 | 4/1965 | Easterwood | 414/534 X |
| 3,447,815 | 6/1969 | West | 280/414 R X |
| 3,993,324 | 11/1976 | Carrick | 280/414 R |

Primary Examiner—Jeffrey V. Nase
Attorney, Agent, or Firm—Williamson, Bains, Moore & Hansen

[57] ABSTRACT

A guide device for boat trailers includes a pair of guide devices each being mounted on one of the rear frame members of the boat trailer and each guide device including a vertically oriented guide roller. Each guide device also includes an obliquely oriented roller which is positioned adjacent the associated vertical roller. The vertical rollers are vertically adjustable and each oblique roller and its associated vertical roller are laterally adjustable as a unit to permit proper spacing between the guide devices to maintain a boat in centered relation as it is pulled upon the trailer.

6 Claims, 4 Drawing Figures

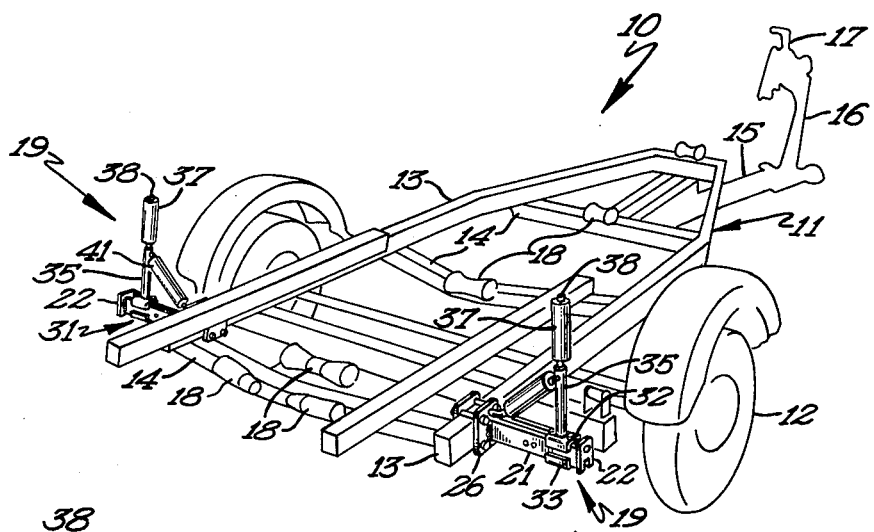
Fig 1
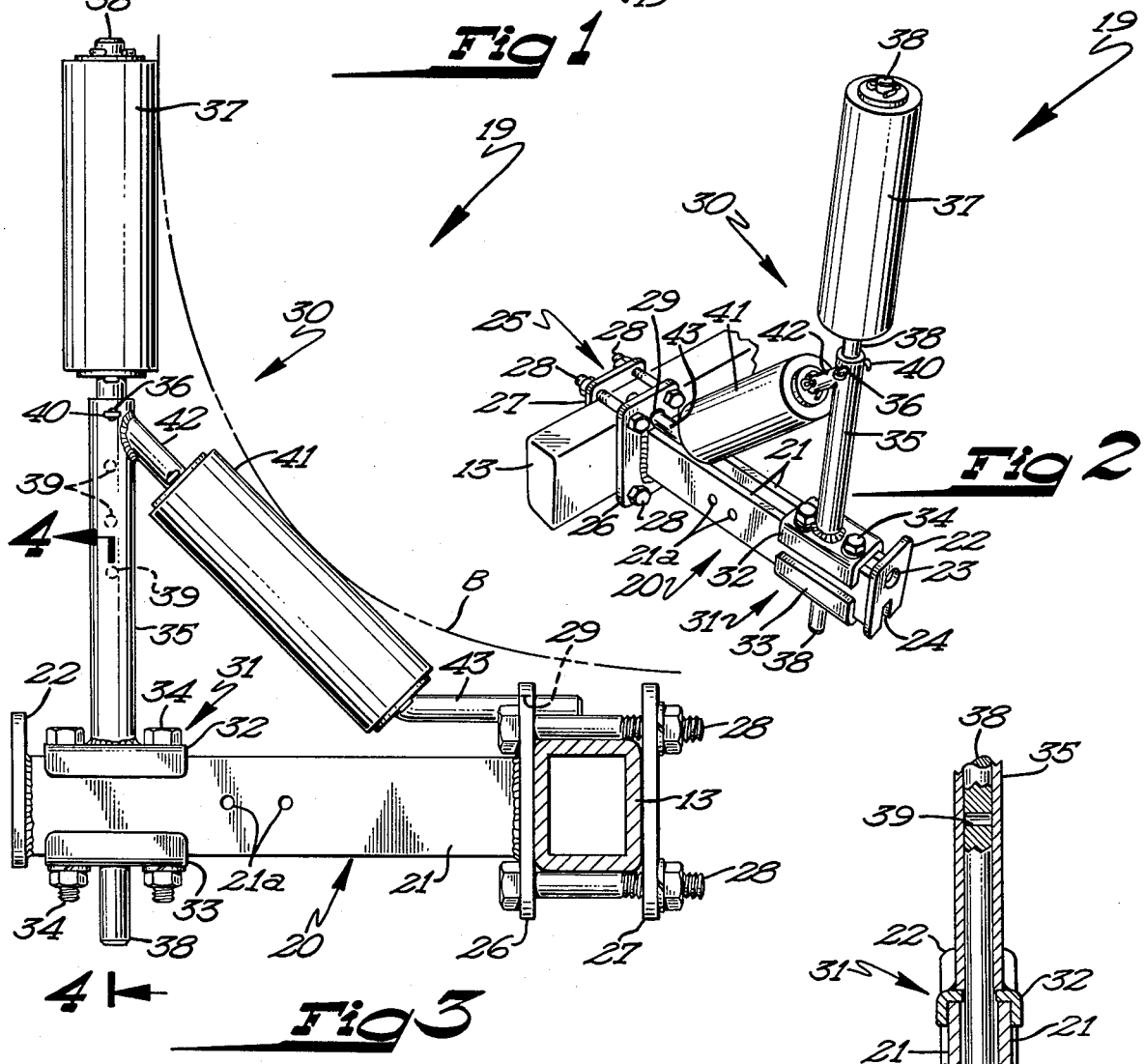
Fig 2
Fig 3
Fig 4

GUIDE DEVICE FOR BOAT TRAILERS

SUMMARY OF THE INVENTION

This invention relates to a boat guide means for boat trailers.

One of the problems involved in loading boats on many types of boat trailers is the problem of maintaining the boat in centered relation as the boat is winched upon the trailer. Usually, two people are required to load a boat on a boat trailer because of the problem of maintaining the boat in centered relation as it is pulled upon the trailer.

It is therefore a general object of this invention to provide a novel guide means, of simple and inexpensive construction, for use with boat trailers, the guide means being operative to maintain a boat in centered relation as it is loaded upon a boat trailer.

More specifically, it is an object of this invention to provide a novel guide means for boat trailers including pairs of inclined and vertically oriented rollers mounted on the trailer frame adjacent the rear end thereof, the rollers being laterally and vertically adjustable and serving to maintain the boat in centered relation as it is winched upon the boat trailer.

These and other objects and advantages of this invention will more fully appear from the following description made in connection with the accompanying drawings, wherein like reference characters refer to the same or similar parts throughout the several views.

FIGURES OF THE DRAWINGS

FIG. 1 is a rear perspective view of a boat trailer incorporating the novel guide means.

FIG. 2 is a fragmentary rear perspective view of a portion of a trailer illustrating a novel guide device;

FIG. 3 is a rear elevational view partly in section of a portion of the trailer and illustrating a boat guide device; and FIG. 4 is a vertical cross-sectional view taken approximately along line 4—4 of FIG. 3 and looking in the direction of the arrows.

DESCRIPTION OF THE PREFERRED EMBODIMENT OF THE INVENTION

Referring now to the figures of the drawings and more particularly to FIG. 1, it will be seen that a boat trailer, designated generally by the reference numeral 10, of conventional construction, is thereshown. The boat trailer 10 includes an elongate chassis or frame 11 having suitable ground engaging wheels 12, the chassis including longitudinally extending frame members 13 rigidly interconnected by suitable transverse frame members 14. The boat trailer is provided with an elongate tongue 15 having a vertical post 16 at its front end which supports a winch 17. The winch 17 is provided with a cable for pulling the boat upon the trailer in a wellknown manner. Suitable horizontal rollers 18 are mounted centrally of the transverse frame members to facilitate loading of the boat on the trailer.

My novel guide means for maintaining a boat in centered relation as it is loaded on the boat trailer 10 includes a pair of similar guide devices 19, each being mounted on one of the longitudinal frame members 13 adjacent the rear ends of the latter. Each guide device includes an elongate horizontally oriented support member 20 comprised of a pair of laterally spaced apart vertically disposed flat rectangular plates 21 each being rigidly secured at its outer end to a vertically disposed outer plate 22. Each outer plate 22 has an opening 23 therein and is also provided with a downwardly facing notch 24 therein.

Clamping means 25 are provided for each support member 20 and each clamping means includes a fixed clamping plate 26 rigidly affixed as by welding to the inner ends of the plates 21. It will be noted that the fixed clamping plate 26 is disposed in parallel relation with the outer plate 22. Each clamping means 25 also includes a movable clamping plate 27 having openings therein for accommodating nut and bolt assemblies 28 which also extend through openings in the fixed clamping plate 26. It will therefore be seen that the movable and fixed clamping plates for each support member clampingly engage one of the longitudinal frame members 13 adjacent its rear end so that the support members 20 dispose horizontally, laterally outwardly from the frame members. It wll further be noted that each fixed clamping member 26 is provided with an opening 29 therein.

Each guide device 19 also includes a roller assembly 30 having mounting means 31 comprising an upper U-shaped mounting plate 32 and a lower U-shaped mounting plate 33. The mounting plates 32 and 33 are provided with suitable openings therein for accommodating nut and bolt assemblies 34 that clampingly engage these mounting plates against the upper and lower surfaces of the associated support member 20.

The roller assembly 30 for each guide device 19 also includes an elongate vertical cylindrical sleeve rigidly affixed at its lower end to the associated U-shaped mounted plate 32 as by welding. Each vertical sleeve 35 has an opening 36 therein preferably located adjacent its upper end as best seen in FIG. 3. An elongate vertically oriented roller 37 formed of a yieldable material is journaled on an elongate axle 38 which projects downwardly therefrom and projects through the associated vertical sleeves 35. The axle 38 has a plurality of longitudinally spaced apart diametrically extending openings therein which when disposed in registering relation with the opening 36 of the associated vertical sleeve to permit a pin 40 to be accommodated in the registering openings. The pin 40 will lock the roller in its axle in a vertical adjusted position. It will be noted that the axle 38 projects through openings in the associated upper and lower mounting plates 32 and 33 and between the flat plates 21 of the elongate support member 20.

Each roller assembly also includes an oblique roller 41 journaled on an obliquely oriented axle 42, the latter including a horizontal terminal portion 43. It will be noted that the upper end of the axle 42 is rigidly affixed to the associated vertical sleeve 35 adjacent the upper end of the latter by welding and that the horizontal terminal portion 43 projects through the opening 29 in the associated fixed clamping plate. The roller 41 corresponds in size to the roller 37 and is disposed in the same general vertical plane as the associated roller 37.

In use, my novel guide means will be mounted on the boat trailer frame adjacent the rear end portion thereof. Since most boat trailers are provided with longitudinal frame members 13, the clamping means 25 for each elongate support member will be clamped to the frame members adjacent the rear end of the trailer. It will be appreciated that the bow end of the boat to be loaded is connected by the cable of the winch 17 and the boat will then be winched upon the trailer in a well known manner. However, because of the variance in width dimensions of boat trailers and the variance in the size of boats, it may be necessary to adjust the spacing of the guide devices 19 so that the vertical rollers 37 and oblique rollers 41 will properly engage the boat as it is being pulled forwardly by the winch device 17.

To adjust the spacing of the guide devices, a user may loosen the nut and bolt assemblies 34 and slide the entire roller assembly laterally relative to the associated support member 20. In this regard, it will be noted that the entire roller assembly of each guide device 19 may be adjusted laterally as a unit. A user may also vertically adjust the vertical roller 37 of each roller assembly to the desired heighth.

Thereafter, when a boat is pulled bow first upon the trailer, the vertical and inclined rollers will center the boat as it is being pulled forwardly upon the trailer and maintain the boat in a centered relation during the entire boat loading operation. These guide devices also facilitate the movement of the boat longitudinally of the trailer.

The guide devices 19 may be easily applied to substantially any commercial trailer without altering the construction of the trailer in any respect. It is pointed out that the downwardly facing notch 24 in the outer plate 22 of each elongate support member very nicely accommodates a jack to permit raising and lowering of the trailer frame for the purpose of changing or replacing ground engaging wheels. The openings 23 may accommodate a tie-down rope, if desired, and the openings 21a in the elongate support members will permit a tail light to be mounted thereon.

From the foregoing description, it will be seen that I have provided a novel guide means for boat trailers which permits boats to be maintained in centered relation as the boats are being loaded on a boat trailer. In this regard, when my novel guide means are used in conjunction with a boat trailer, a single operator may easily load the boat on the boat trailer since the boat will be maintained in a centered relation as it is being winched forwardly.

Thus, it will be seen that I have provided a novel guide means, which is not only of simple and inexpensive construction, but one which functions in a more efficient manner than any heretofore known comparable device.

It is anticipated that various changes can be made in the size, shape and construction of the boat trailer device disclosed herein without departing from the spirit and scope of my invention as defined by the following claims.

What is claimed is:

1. A boat guide mechanism for mobile boat trailers having front and rear ends, ground engaging wheels, and longitudinally extending members, comprising:
   a pair of guide devices each including an elongate support member, each support member having means on one end thereof releasably engaging a longitudinally extending frame member of a boat trailer adjacent the rear end thereof to orient the support member in horizontally, laterally extending relation,
   each guide device comprising a roller assembly including mounting means secured to said support member and being longitudinally adjustable relative thereto, a vertically disposed roller mounted on said mounting means and being vertically adjustable relative thereto, an elongate, oblique roller having one end thereof secured to said mounting means and having the other end thereof connected with said support member, said oblique roller having a rotational axis disposed in inclined relation relative to said support member and being shiftable with said mounting means in a direction longitudinally of the support member.

2. The boat guide mechanism as defined in claim 1 wherein said mounting means includes a vertical sleeve, said vertical roller having an axle movable in said vertical sleeve and means for securing said axle in an adjusted position.

3. The boat guide mechanism as defined in claim 1 wherein each of said horizontal support members has a vertical plate secured to the outer end thereof, a downwardly facing notch in said plate for accommodating a lifting jack therein.

4. The boat guide mechanism as defined in claim 1 wherein said mounting means includes a generally U-shaped mounting plate shiftably mounted on said support member for shifting movement longitudinally thereof, means for securing said mounting plate in an adjusted position, and an elongate sleeve secured to said mounting plate and extending vertically therefrom, said vertical roller having an axle projecting into said sleeve and being vertical adjustable relative to said sleeve.

5. A boat guide mechanism for mobile boat trailers having front and rear ends, ground engaging wheels, and longitudinally extending members, comprising:
   a pair of guide devices each including an elongate support member, each support member having means on one end thereof releasably engaging a longitudinally extending frame member of a boat trailer adjacent the rear end thereof to orient the support member in horizontally, laterally extending relation,
   each guide device comprising a roller assembly including an elongate vertically oriented sleeve, means securing said sleeve to said support member and being longitudinally adjustable relative thereto, an elongate vertically disposed roller mounted on said sleeve and being vertically adjustable relative thereto, an elongate, oblique roller having one end thereof secured to said sleeve adjacent the upper end thereof and having the other end thereof connected with said support member adjacent the inner end thereof, said oblique roller having a rotational axis disposed in inclined relation relative to said support member and being shiftable with said sleeve and securing means in a direction longitudinally of the support member.

6. The boat guide mechanism as defined in claim 5 wherein said securing means includes a pair of generally U-shaped mounting plates shiftably mounted on said support member for shifting movement longitudinally thereof, means for securing said mounting plates together in an adjacent position relative to said support member.

* * * * *